United States Patent
Kim et al.

(10) Patent No.: US 8,701,241 B2
(45) Date of Patent: Apr. 22, 2014

(54) FLAT WIPER BLADE WITH SPOILER

(75) Inventors: In Kyu Kim, Ansan-si (KR); Kyung Jong Nam, Cheongyang-gun (KR)

(73) Assignee: The Korea Development Bank, Seoul (KR)

( * ) Notice: Subject to any disclaimer, the term of this patent is extended or adjusted under 35 U.S.C. 154(b) by 0 days.

(21) Appl. No.: 13/816,374

(22) PCT Filed: Sep. 8, 2011

(86) PCT No.: PCT/KR2011/006660
§ 371 (c)(1),
(2), (4) Date: Feb. 11, 2013

(87) PCT Pub. No.: WO2012/033363
PCT Pub. Date: Mar. 15, 2012

(65) Prior Publication Data
US 2013/0227811 A1  Sep. 5, 2013

(30) Foreign Application Priority Data

Sep. 10, 2010 (KR) .................. 10-2010-0089005
Sep. 6, 2011 (KR) .................. 10-2011-0090239

(51) Int. Cl.
*B60S 1/38* (2006.01)
*B60S 1/40* (2006.01)

(52) U.S. Cl.
USPC ............... 15/250.201; 15/250.32; 15/250.43

(58) Field of Classification Search
USPC ........... 15/250.201, 250.361, 250.32, 250.43, 15/250.44
See application file for complete search history.

(56) References Cited

U.S. PATENT DOCUMENTS

| | | | | | |
|---|---|---|---|---|---|
| 3,879,793 | A | * | 4/1975 | Schlegel | 15/250.201 |
| 5,970,570 | A | * | 10/1999 | Groninger | 15/250.44 |
| 6,108,857 | A | * | 8/2000 | Lee | 15/250.201 |
| 7,228,588 | B2 | | 6/2007 | Kraemer et al. | |
| 7,484,264 | B2 | * | 2/2009 | Kraemer et al. | 15/250.201 |
| 8,191,200 | B2 | | 6/2012 | Kim | |
| 2008/0289133 | A1 | * | 11/2008 | Kim | 15/250.32 |

FOREIGN PATENT DOCUMENTS

| | | |
|---|---|---|
| JP | 2000-190818 A | 7/2000 |
| JP | 2006-290220 A | 10/2006 |
| JP | 2007-196905 A | 8/2007 |
| JP | 2008-285140 A | 12/2007 |
| JP | 2010-500949 A | 1/2010 |
| KR | 10-2005-0027974 A | 3/2005 |
| KR | 10-2008-0014717 A | 2/2008 |
| KR | 10-2009-0042785 A | 4/2009 |
| WO | 2006/049437 A1 | 5/2006 |

* cited by examiner

*Primary Examiner* — Gary Graham
(74) *Attorney, Agent, or Firm* — Sughrue Mion, PLLC

(57) ABSTRACT

A flat wiper blade with spoilers is provided. The flat wiper blade has a wiper strip, a single elongated frame, first and second spoilers and a connecting unit for connection to a wiper arm. The frame holds and supports the wiper strip. The first and second spoilers have a pair of longitudinally extending fitting grooves and a receiving groove in the fitting groove. The receiving groove has a width greater than that of the fitting groove. The first and second spoilers are joined to the frame as opposed to each other in such a manner that the frame is fitted to the fitting grooves and an edge of the frame is received in the receiving groove. The connecting unit is joined to the frame between the first spoiler and the second spoiler. The connecting unit engages the first spoiler and the second spoiler.

11 Claims, 17 Drawing Sheets ed as WO 2012/033363A2 on
FLAT WIPER BLADE WITH SPOILER

RELATED APPLICATIONS

This is a 35 U.S.C. §371 U.S. National Phase of International Application No. PCT/KR2011/006660 filed on Sep. 8, 2011 and published in English as WO 2012/033363A2 on Mar. 15, 2012, which claims priority to KR 10-2010-0089005 filed on Sep. 10, 2010 and KR 10-2011-0090239 filed on Sep. 6, 2011. The contents of the aforementioned applications are incorporated by reference in their entirety.

TECHNICAL FIELD

The present invention relates to a flat wiper blade with spoilers.

BACKGROUND ART

Motor vehicles are equipped with a windshield wiper device for cleaning or wiping a surface of a windshield. The windshield wiper device includes a wiper motor, a wiper arm and a wiper blade. The wiper arm is connected to a rotating shaft of the wiper motor at its base end and is oscillated by the wiper motor. The wiper blade is separably joined to a distal end of the wiper arm. The wiper blade is positioned on the surface of the windshield by the wiper arm. The wiper blade wipes the surface of the windshield while sliding thereon through oscillating movements of the wiper arm.

The wiper blade has an elongated wiper strip and a frame for holding and supporting the wiper strip in its longitudinal direction. The wiper strip is placed in contact with the windshield surface. The frame may comprise an assembly including a main yoke and a plurality of sub yokes linked to the main yoke. A wiper blade with such a frame is known in the art as "a conventional wiper blade." A wiper blade, which uses a single frame curving with a certain curvature and having a thin and elongated bar shape as the frame, has been recently used. Such a wiper blade is known in the art as "a flat wiper blade" or "a flat-bar wiper blade." The flat wiper blade has a height lower than a conventional wiper blade and is subjected to less air resistance when compared to the conventional wiper blade. Further, the flat wiper blade can bring its wiper strip into contact the windshield surface under a uniform load.

When such wiper blades are placed on a windshield of a vehicle, wind or air stream impinging on the windshield during running of a vehicle exerts forces to the wiper blade throughout the entire length of the wiper blade. The wiper blade is positioned generally vertically on the surface of the inclined windshield. Thus, the forces caused by the wind or air stream act in a direction of lifting up the wiper blade from the surface of the windshield. The faster the vehicle runs, the stronger such lift forces would be. This weakens the contact between the wiper strip and the windshield surface, thus deteriorating wiping performance.

To address the deterioration of the wiping performance due to the lift of a wiper blade, a main yoke and sub yokes of a convention wiper blade are provided with apertures permitting the air stream to pass therethrough. Further, to apply forces in a direction opposite to the lift of the wiper blade during running of a vehicle to restrain the lift, spoilers are attached to a wiper blade. The spoiler has a profile that produces reaction forces toward the windshield surface from reaction to the wind or air stream.

Such a spoiler is made from a plastic or rubber material. The spoiler may be separably attached to the main yoke of a conventional wiper blade. Further, the spoiler may be separably attached to the frame of a flat wiper blade. By way of example of a coupling configuration between a spoiler and a flat wiper blade, U.S. Pat. No. 7,228,588 discloses that a frame and spoilers of the flat wiper blade are coupled to one another by fitting.

SUMMARY

In the flat wiper blade wherein a frame is fitted to spoilers, the spoilers may not be held on the frame due to the operation of the flat wiper blade and thus may be separated therefrom. Further, after the flat wiper blade is used for a long time, a portion of the spoiler, to which forces are exerted and stresses concentrate due to contact to the frame, may tear or crack. This may damage or break the spoiler.

The present invention is directed to solving the aforementioned problems of the prior art. It is an object of the present invention to provide a flat wiper blade with spoilers reliably joined thereto.

It is a further object of the present invention to provide a flat wiper blade having a coupling configuration between the spoilers and the frame for enhancing the durability of the spoiler.

It is another object of the present invention to provide a flat wiper blade with spoilers that is configured to efficiently prevent the lift of the flat wiper blade and has a strong inner structure while achieving the aforementioned objects.

To achieve the above and other objects, in one exemplary embodiment, the present invention provides a flat wiper blade that has a wiper strip, a single elongated frame, first and second spoilers and a connecting unit. The wiper strip is configured to contact a surface of a windshield. The frame is configured to hold and support the wiper strip. The first and second spoilers are joined to the frame as opposed to each other. Each of the first and second spoilers includes a pair of fitting grooves extending in a longitudinal direction of the frame and a receiving groove extending in the longitudinal direction in the fitting groove. The receiving groove has a width greater than a width of the fitting groove. The frame is fitted to the fitting grooves and edges of the frame are received in the receiving grooves. The connecting unit is joined to the frame between the first spoiler and the second spoiler, and is configured to be connected to a wiper arm. The connecting unit engages the first spoiler and the second spoiler.

In an embodiment of the present invention, the receiving groove has a rounded surface.

In an embodiment of the present invention, the first and second spoilers have a holder extending along either edge thereof and located under the frame. The fitting groove is formed along an inside of the holder. The holder extends to closely contact the wiper strip by interference fit.

In an embodiment of the present invention, the first and second spoilers have a pressing ridge protruding inwardly of the fitting groove in the fitting groove.

In an embodiment of the present invention, the first and second spoilers have a concave surface extending along a leading edge. The concave surface is concave in both lateral and longitudinal directions of the first and second spoilers. An apex end of the concave surface is closer to a trailing edge of the first and second spoilers than the leading edge. The first and second spoilers have a plurality of indents arranged along the leading edge.

In an embodiment of the present invention, the first and second spoilers have a plurality of cross ribs therein.

In an embodiment of the present invention, the connecting unit includes a bracket joined to the frame and having a pivot shaft. The bracket engages a base end of the first spoiler at one end and engages a base end of the second spoiler at an opposite end.

In an embodiment of the present invention, the first spoiler has a latching claw at the base end thereof and the second spoiler has a latching groove at the base end thereof. The bracket has a slot at the one end thereof and an engaging rib at the opposite end thereof. The latching claw engages the slot and the engaging rib engages the latching groove. The bracket may have an insertion cavity at the opposite end and the second spoiler may have an insertion portion at the base end thereof. The insertion portion is fitted to the insertion cavity. The engaging rib is formed in the insertion cavity in a lateral direction of the frame and the latching groove is formed in the insertion portion in the lateral direction of the frame.

In an embodiment of the present invention, the connecting unit further includes an adaptor pivotally mounted on the bracket via the pivot shaft and configured to be separably connected to the wiper arm.

According to the flat wiper blade of the embodiments, the spoilers are joined to the frame by fitting therebetween, while coupled to the bracket by engagement therebetween. Thus, the flat wiper blade includes the spoilers joined to the frame and the bracket. Further, since the edge of the frame is situated in the receiving groove of the spoiler having the rounded surface, the spoiler does not have a portion on which stresses concentrate and thus has an improved durability. Moreover, the spoiler can produce more reaction forces due to the concave surface and the indents.

DETAILED DESCRIPTION

Figure 1:
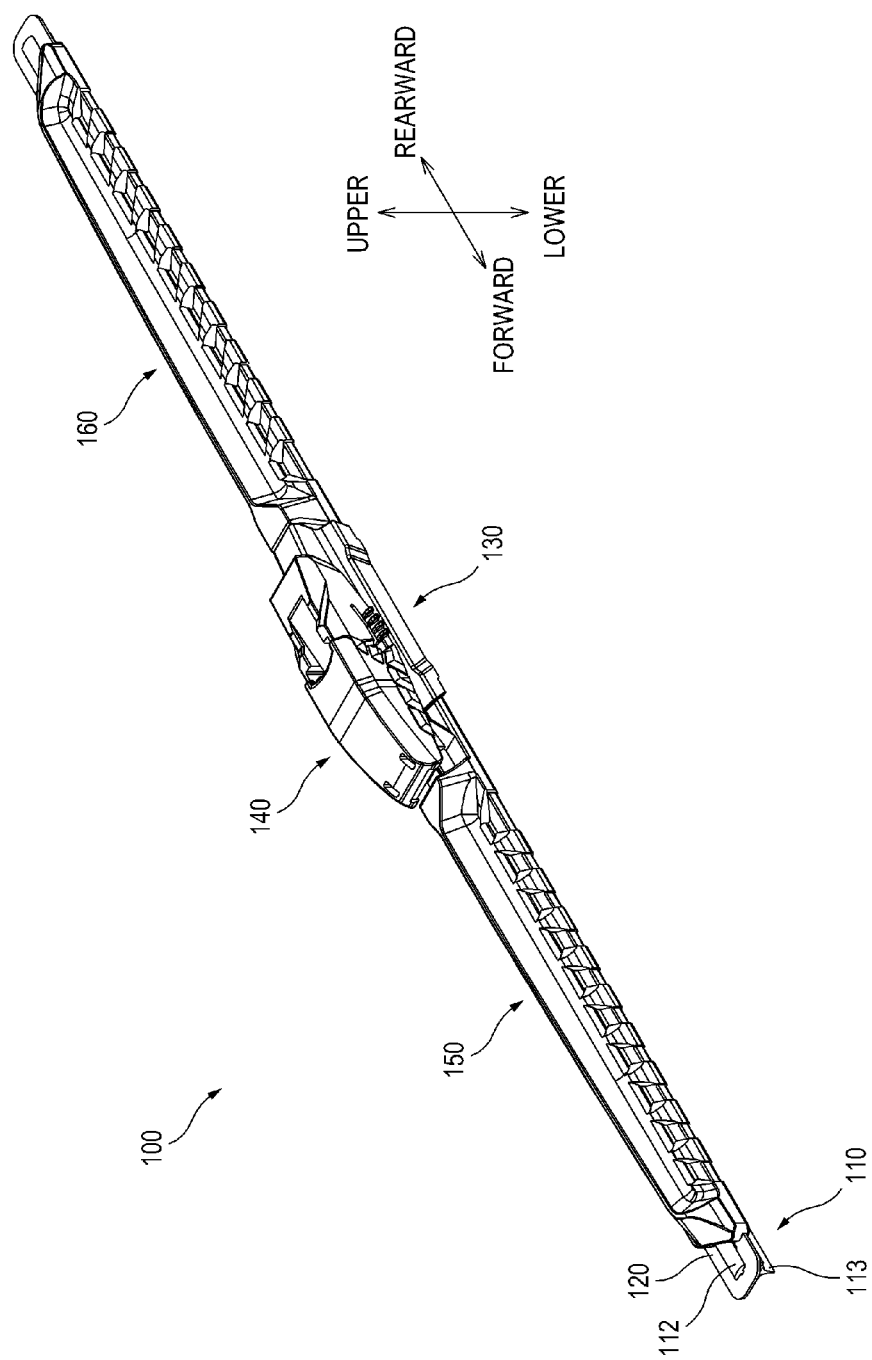
FIG. 1 is a perspective view showing a flat wiper blade according to a first embodiment.

Embodiments of a flat wiper blade are described more fully with reference to the accompanying drawings. Like reference numerals in the drawings refer to like element or parts.

As used herein, the directional term "upper," "upward" or the like is generally based on an orientation, with which a bracket is placed relative to a frame bar in the drawings, while the directional term "lower," "downward" or the like generally refers to a direction opposite to the upward or upper direction. A flat wiper blade shown in the accompanying drawings may be otherwise oriented (e.g., rotated 180 degrees or at other orientations) and the aforementioned directional terms may be interpreted accordingly. Further, as used herein, the directional term "forward," "front" or the like generally refers to a direction away from a wiper arm in a longitudinal direction of the wiper arm, while the directional term "backward," "rearward," "rear" or the like generally refers to a direction opposite to the forward or front direction.

Figure 2:
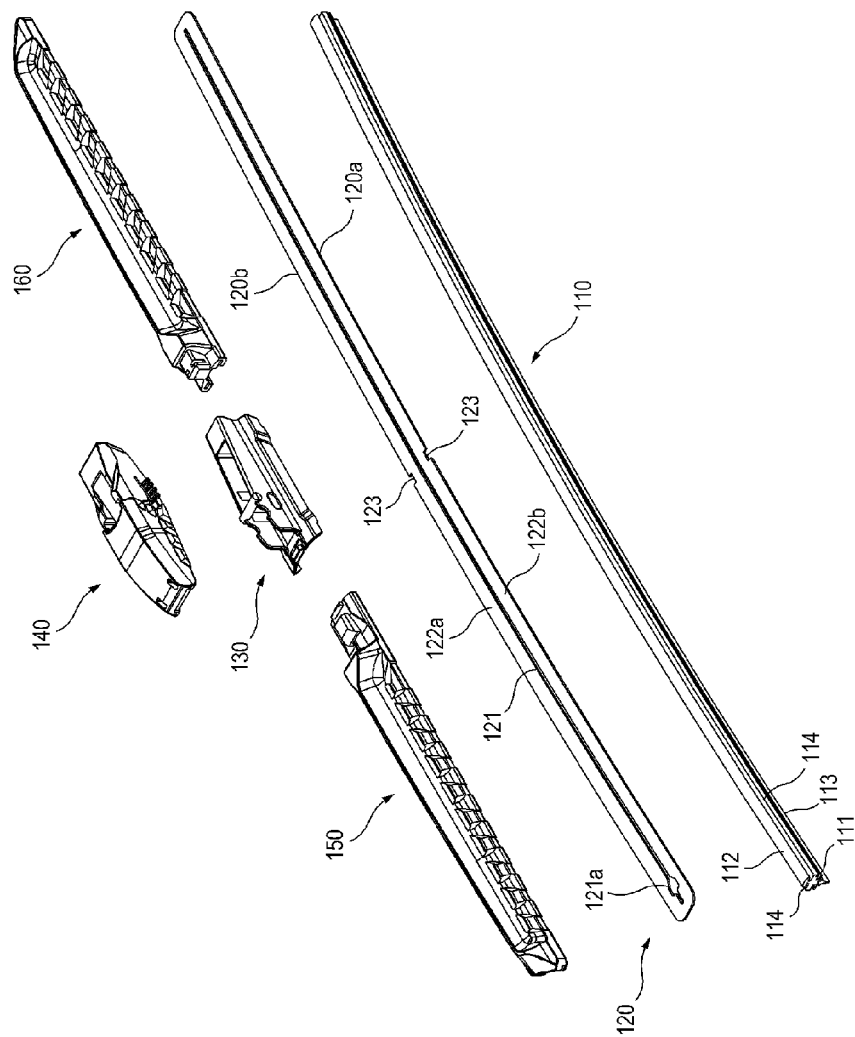
FIG. 2 is an exploded perspective view showing the flat wiper blade shown in FIG. 1.
Figure 3:
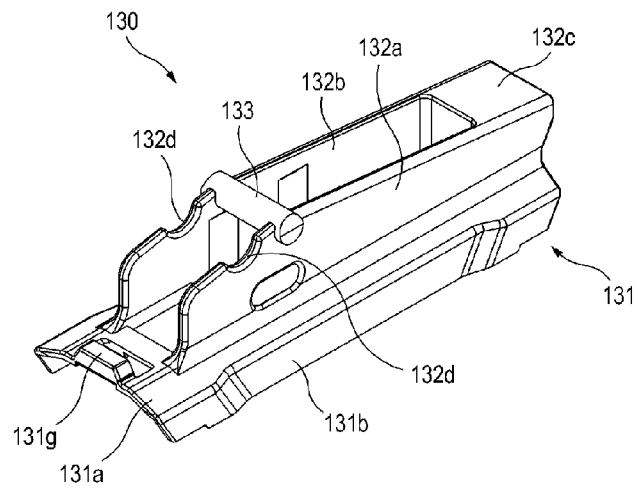
FIG. 3 is an upper perspective view of a bracket.
Figure 4:
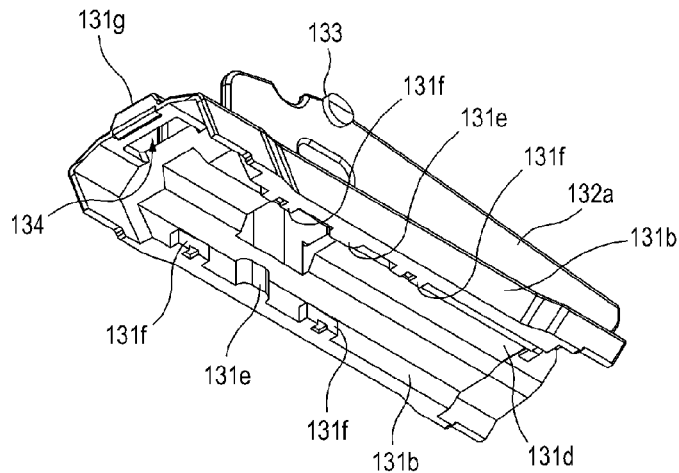
FIG. 4 is a lower perspective view of the bracket.
Figure 5:
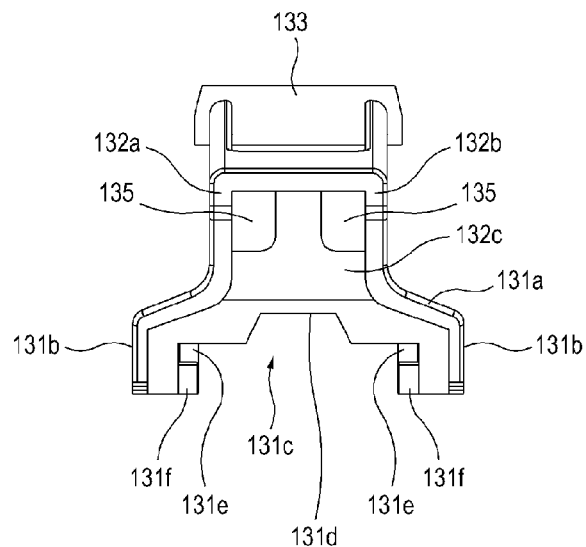
FIG. 5 is a rear view of the bracket.
Figure 6:
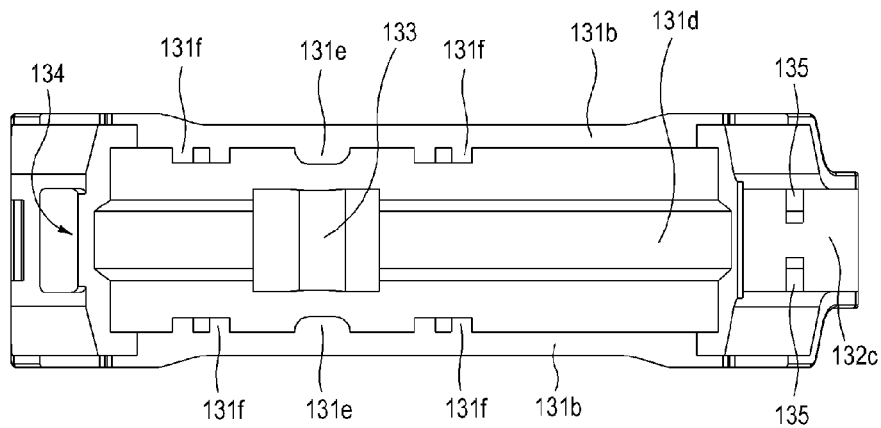
FIG. 6 is a bottom view of the bracket.
Figure 7:
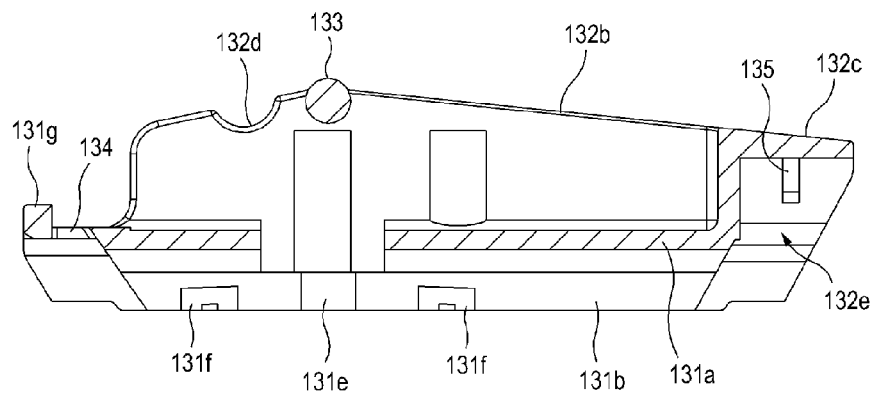
FIG. 7 is a longitudinally sectional view of the bracket.
Figure 8:
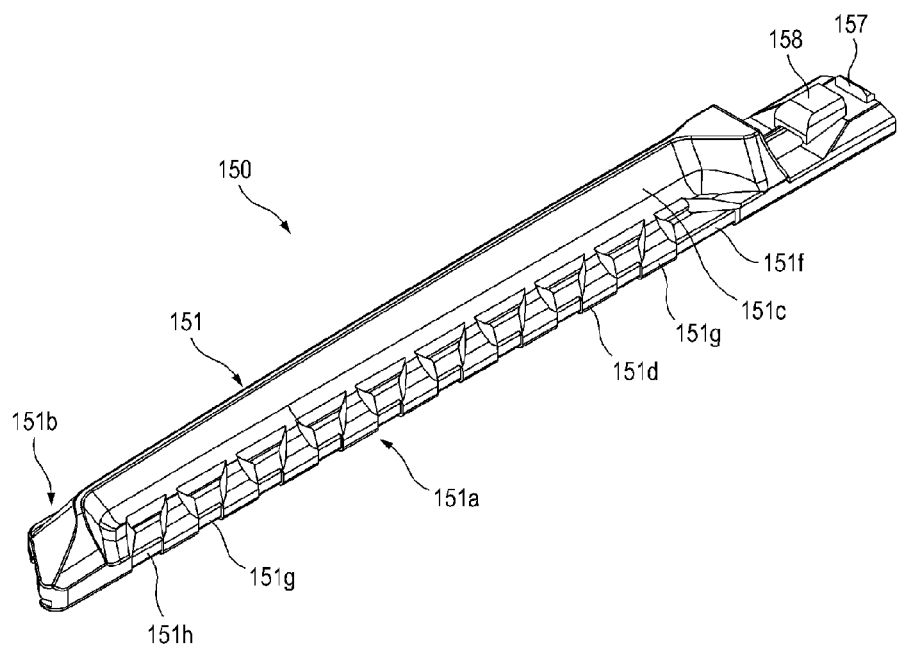
FIG. 8 is a perspective view of a first spoiler.
Figure 9:
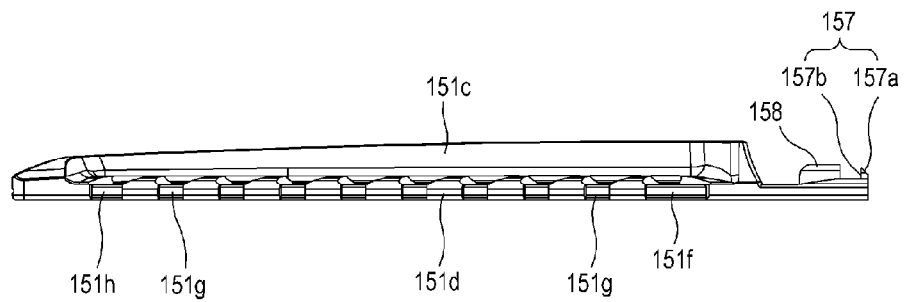
FIG. 9 is a right side view of the first spoiler.
Figure 10:
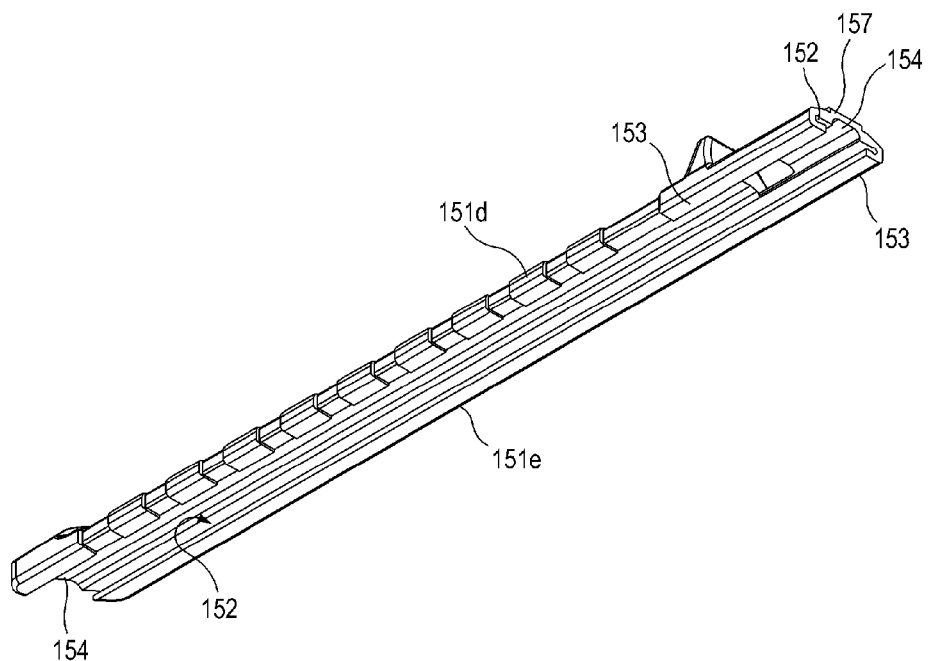
FIG. 10 is a lower perspective view of the first spoiler.
Figure 11:
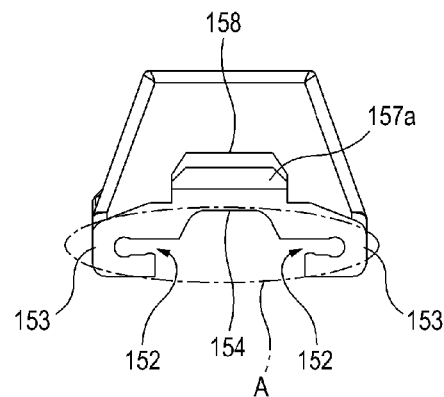
FIG. 11 is an end view of a base end of the first spoiler.
Figure 12:
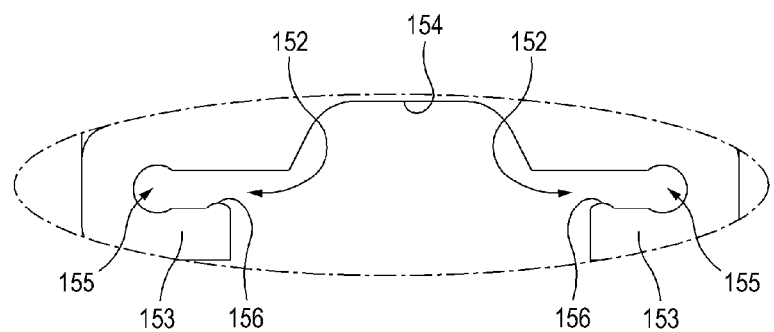
FIG. 12 is an enlarged view of a portion A in FIG. 11.
Figure 13:
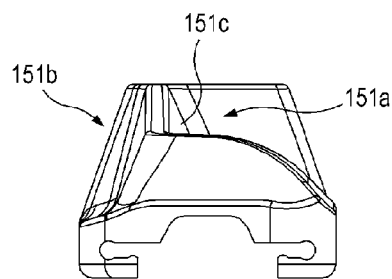
FIG. 13 is an end view of a distal end of the first spoiler.
Figure 14:
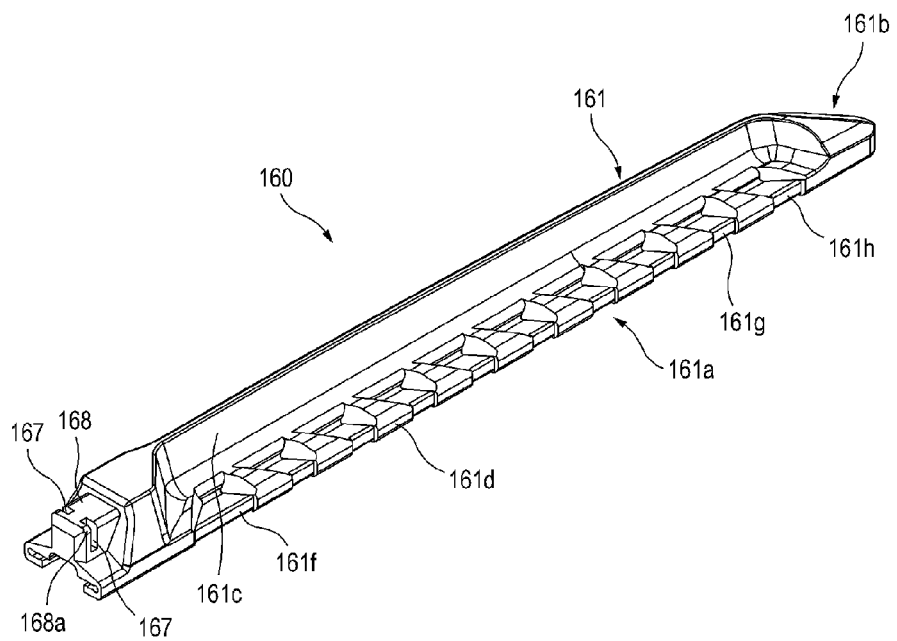
FIG. 14 is a perspective view of a second spoiler.
Figure 15:
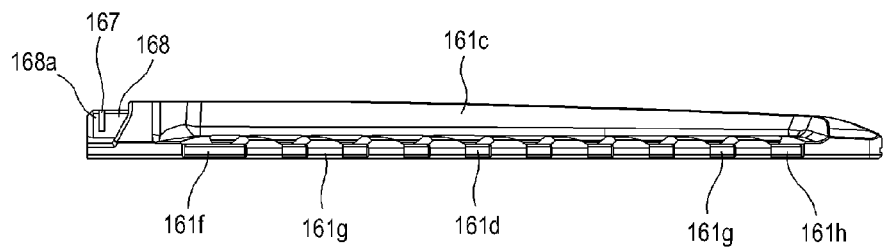
FIG. 15 is a right side view of the second spoiler.
Figure 16:
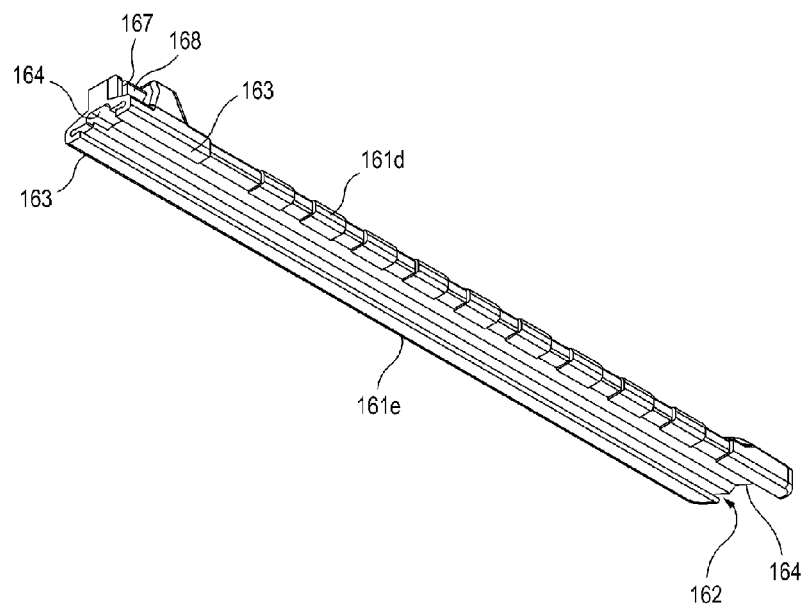
FIG. 16 is a lower perspective view of the second spoiler.
Figure 17:
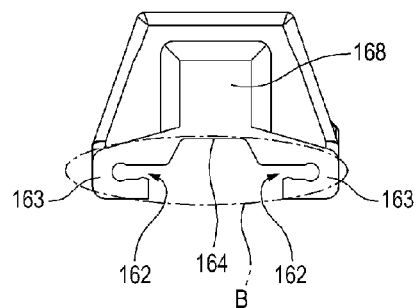
FIG. 17 is an end view of a base end of the second spoiler.
Figure 18:
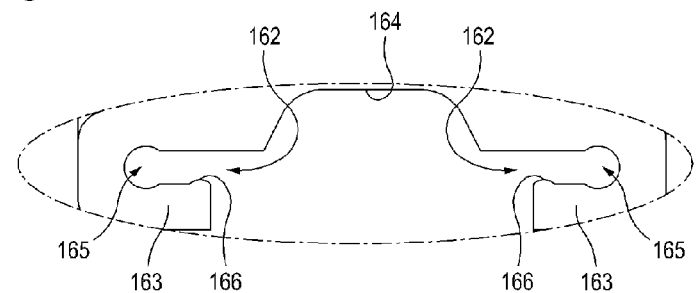
FIG. 18 is an enlarged view of a portion B in FIG. 17.
Figure 19:
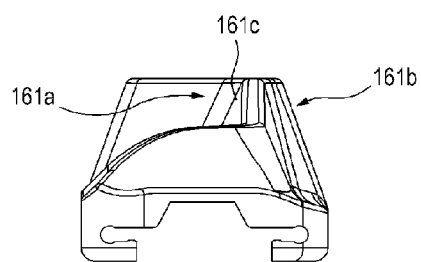
FIG. 19 is an end view of a distal end of the first spoiler.

Referring to FIGS. 1 and 2, in one exemplary embodiment, a flat wiper blade 100 includes the following: a wiper strip 110; a single elongated frame (a frame bar 120) for holding and supporting the wiper strip 110; a connecting unit fixed to the frame bar 120 for connection to a wiper arm; and a first spoiler 150 and a second spoiler 160 joined to the frame bar 120 in front and rear of said connecting unit respectively.

The wiper strip 110 may be made from, for example, a rubber or elastomer material. The wiper strip 110 has an elongated body portion 111, an a head portion 112 that extends longitudinally on the body portion 111 and is placed on the frame bar 120, and a wiper lip 113 that extends longitudinally under the body portion 111 and is placed in contact with a surface of a windshield. The wiper strip 110 has a pair of grooves 114 for coupling to the frame bar 120 between the body portion 111 and the head portion 112. The grooves 114 extend in a longitudinal direction of the wiper strip 110.

The frame bar 120 functions as a frame of the flat wipe blade 100. The frame bar 120 fixes and supports the wiper strip 110 in the longitudinal direction thereof. The frame bar 120 has a shape of a thin and elongated bar. The frame bar 120 may be made from a metallic or plastic material. Further, the frame bar 120 may be made by coating a metallic or plastic bar-shaped part with paint. The frame bar 120 may be curved with a certain curvature as shown in FIG. 2. Alternatively, the frame bar may be formed without any curvature.

The frame bar 120 has a slot 121 formed along a longitudinal direction of the frame bar. The slot 121 extends from the proximity of a front end of the frame bar 120 to the proximity of a rear end of the frame bar. The frame bar 120 has a first half section 122a and a second half section 122b with respect to the slot 121. A triangular insertion inlet 121a is formed at one end of the slot 121. Since the frame bar 120 has the slot 121 formed along its longitudinal center line, if forces are applied to both longitudinal edges of the frame bar 120 inwardly of the frame bar, then each half section 122a, 122b of the frame bar 120 can flex or curve inwardly. Further, the frame bar 120 has notches 123 at either edge in the middle section. The notches 123 are concave inwardly from an outer edge of each half section 122a, 122b. The notches 123 participate in engagement to the bracket 130 of the connecting unit. The wiper strip 110 may be affixed to the frame bar 120 by inserting its one end into the insertion inlet 121a and then fitting in along the slot 121 of the frame bar 120. Specifically, the wiper strip 110 may be joined to the frame bar 120 by inserting one end portion of the head portion 112 into the insertion inlet 121a and then fitting a portion between the grooves 114 into the slot 121. When the wiper strip 110 is coupled to the frame bar 120, the head portion 112 of the wiper strip 110 protrudes on an upper surface of the frame bar 120.

Said connecting unit is configured to separably connect an assembly comprised of the wiper strip 110, the frame bar 120 and the first and second spoilers 150, 160 to a distal end of a wiper arm. Further, the connecting unit is configured to be joined to the first and second spoilers 150, 160 by engagement therebetween. In this embodiment, the connecting unit comprises a bracket 130 fixed to the frame bar 120 and an adaptor 140 pivotally mounted on the bracket 130 for connection to the distal end of a wiper arm. The first and second spoilers 150, 160 engage the bracket 130. In other embodiment, the connecting unit may comprise only a bracket with parts for connection to the distal end of a wiper arm. In other embodiment, the connecting unit may comprise a single part combining the bracket with the adaptor.

The bracket 130 is separably joined to the frame bar 120. The bracket 130 serves as a base on which the adaptor 140 is mounted. The bracket 130 functions to hold the frame bar 120 during operation of a wiper arm. The bracket 130 is disposed in a midway portion of the frame bar 120. For example, the bracket 130 is joined to the frame bar 120 in such a manner that a part of the bracket 130 engages the edge of the frame bar 120 and holds the edge portion of the frame bar 120.

Referring to FIGS. 3 to 7, the bracket 130 includes the following: a holder 131 configured to substantially cover up the frame bar 120 in a lateral direction of the frame bar; a pair of support wall portions 132a, 132b vertically formed on the holder 131; and a pivot shaft 133 disposed at an upper end of the support wall portions 132a, 132b with a portion thereof protruding on the upper end.

The holder 131 has a generally fork-like cross section. The holder 131 has a base portion 131a placed on the frame bar 120 and a pair of leg portions 131b extending downwardly from lateral edges of the base portion 131a. A distance between the leg portions 131b is equal to or somewhat smaller than the width of the frame bar 120. The frame bar 120 is positioned in a space 131c defined by the base portion 131a and the leg portions 131b. A groove or recess 131d longitudinally extends on an underside of the base portion 131a. The groove 131d functions to receive the head portion 112 of the wiper strip 110 appearing on the frame bar 120. The bracket 130 has engaging protrusions 131e protruding from lower edges of the leg portions 131b toward the space 131c. The engaging protrusion 131e is shaped to corresponding to the notch 123 formed in the frame bar 120. Further, the holder 131 has holding claws 131f protruding from the leg portions 131b toward the space 131c. The holding claws 131f are disposed on the lower edges of the leg portions 131b with the engaging protrusion 131e therebetween. The edge portion of the frame bar 120 is situated on top of the holding claws 131f. One side of the holding claw 131f facing toward the engaging protrusion 131e is higher than the opposite side thereof. That is, a top surface of the holding claw 131f becomes gradually lower relative to a flat bottom surface of the base portion 131a as going away from the engaging protrusion 131e (see FIG. 7). When the curved frame bar 120 is placed between the top surface of the holding claws 131f and the bottom surface of the base portion 131a, the frame bar 120 can curve without any restraint between the holding claws 131f and the base portion 131a due to the above-noted configuration of the holding claws 131f.

When assembling the frame bar 120 and the bracket 130, one of the notches 123 of the frame bar is first engaged to the engaging protrusion 131e as the half sections 122a, 122b of the frame bar 120 are closed to each other. Then, a portion adjacent to the notch 123 is pushed in between the base portion 131a and the holding claws 131f. Thereafter, the other half section of the frame bar 120 is fully pushed into the space 131c and the force exerted to each half section of the frame bar 120 is removed. Then, each half section reverts to its initial position due to elasticity of the frame bar and thus the frame bar 120 is fully situated within the space 131c. When the frame bar 120 and the bracket 130 are assembled to each other, the engaging protrusions 131e of the bracket 130 and the notches 123 are in engagement with each other. Thus, the frame bar 120 and the bracket 130 are fixed in the longitudinal direction of the frame bar 120. Further, when assembled, each half section 122a, 122b of the frame bar 120 is placed between the lower surface of the base portion 131a and the upper surfaces of the holding claws 131f with a little play or gap therebetween. Thus, the frame bar 120 and the bracket 130 are fixed in a direction perpendicular to the longitudinal direction of the frame bar 120.

The support wall portions 132a, 132b are formed parallel to each other on the base portion 131a of the holder 131. A distance between the support wall portions 132a, 132b is less than a width of the base portion 131a. Further, rear edges of the support wall portions 132a, 132b are continued to a rear edge of the holder 131, while front edges of the support wall portions are not continued to a front edge of the holder 131. That is, when viewing the bracket 130 sideways, the rear edges of the holder 131 and the support wall portions 132a, 132b are in a line, whereas the front edge of the support wall portions 132a, 132b is spaced rearward from the front edge of the holder 131. Accordingly, the bracket 130 is configured such that its forward portion is lower than its rearward portion, thereby increasing a pivoting range of the adaptor 140 on its forward portion.

Further, a bridge portion 132c is formed in the rear end portion of the support wall portions 132a, 132b, thus defining an insertion cavity 132e therein. The bridge portion 132c is angularly bent. Moreover, semicircular notches 132d are formed in the upper edges of the support wall portions 132a, 132b in front of the pivot shaft 133. The notches 132d bear a part of a wiper arm or prevent interference between the part and the support wall portions 132a, 132b.

The pivot shaft 133 extends on top of the support wall portions 132a, 132b with an orientation substantially perpendicular to the longitudinal direction of the frame bar 120. Both lateral ends of the pivot shaft 133 slightly protrude outwardly of the support wall portions 132a, 132b. The pivot shaft 133 is fitted to or engages the adaptor 140, thereby pivotally joining the adaptor 140 to the bracket 130. The pivot shaft 133 serves as a pivot center of the flat wiper blade 100 with respect to a wiper arm. In the shown embodiment, the pivot shaft 133 is a solid shaft. In some embodiment, the pivot shaft 133 includes a hollow shaft with a bore therethrough. A part of a wiper arm may be inserted and fitted to such a bore.

The bracket 130 and the first and second spoilers 150, 160 of the flat wiper blade 100 have an element for interlock therebetween. Said element may comprise a first element and a second element which complementarily engage each other. The first element is provided in the bracket 130, while the second element is provided in each of the first and second spoilers 150, 160. Further, the first element may comprise a slot and a rib, while the second element may comprise a protrusion and a groove. A combination of the slot and the protrusion may be configured such that the protrusion elastically engages the slot in the longitudinal direction of the frame bar 120. A combination of the rib and the groove may be configured such that the rib and the groove are oriented perpendicularly to the longitudinal direction of the frame bar 120 and the rib elastically engages the groove in the longitudinal direction.

In this embodiment, the bracket 130 has a slot and an engaging rib as said first element The slot 134 is formed in a front end of the bracket 130 (one end of the bracket), while the engaging rib 135 is formed in a rear end of the bracket 130 (the opposite end of the bracket). Specifically, the bracket 130 has the slot 134 in the vicinity of a front end portion of the base portion 131a, in which the support wall portions 132a, 132b do not exist. The slot 134 extends perpendicularly to the longitudinal direction of the frame bar 120. A catch protrusion 131g is formed at the front end of the base portion 131a adjacent to the slot 134. Further, the bracket 130 has a pair of engaging ribs 135 in the bridge portion 132c at the rear end portion. The engaging ribs 135 are oriented in the lateral direction of the frame bar 120. The slot 134 participates in joining of the first spoiler 150 and the bracket 130. The engaging ribs 135 participate in joining of the second spoiler 160 and the bracket 130.

The adaptor 140 is mounted on the bracket 130. A distal end portion of a wiper arm may be separably coupled to the adaptor 140. The flat wiper blade 100 is connected to the wiper arm in such a manner that the adaptor 140 and the distal end portion of the wiper arm are coupled to each other. The adaptor 140 has a part to which the pivot shaft 133 of the bracket 130 is engaged or fitted. Thus, when the flat wiper blade 100 is connected to the wiper arm via the adaptor 140, an assembly comprised of the wiper strip 110, the frame bar 120, the bracket 130 and the first and second spoilers 150, 160 can rotate around the pivot shaft 133 relative to the wiper arm within a certain angular range.

The first spoiler 150 and the second spoiler 160 are joined to a front portion and a rear portion of the frame bar 120 by fitting therebetween and are thus opposed to each other with respect to the bracket 130. The first and second spoilers 150, 160 may be made from a pliable or flexible rubber material. In this embodiment, the first and second spoilers 150, 160 have a symmetrical shape except for a portion to be joined to the bracket 130. In the descriptions on the spoilers, ends of the spoilers facing to the bracket are referred to as a base end, while the opposite ends thereto are referred to as a distal end.

Referring to FIGS. 8 to 19, the first and second spoilers 150, 160 have a vane portion 151, 161 and fitting grooves 152, 162 to which the frame bar 120 inserted and fitted. The vane portions 151, 161 are symmetrically shaped. The fitting grooves 152, 162 longitudinally extend from the base end of each spoiler to the distal end underneath the vane portion 151, 161.

The vane portion 151, 161 extends from the proximity of the base end of each spoiler 150, 160 to the distal end of each spoiler. The vane portion 151, 161 has a height that becomes gradually lower toward the distal end. The vane portion 151, 161 has a profile that reacts to wind or air stream created during running of a vehicle and produces reaction forces preventing the flat wiper blade 100 from rising up.

The vane portion 151, 161 has a leading portion 151a, 161a located where wind or air stream comes in and a trailing portion 151b, 161b located where the wind or air stream goes out (i.e., located opposite to the leading portion). Further, the vane portion 151, 161 has a concave surface 151c, 161c, which is concave inwardly of the vane portion, in the leading portion 151a, 161a. The concave surface 151c, 161c is formed in the leading portion 151a, 161a and has a length shorter than the vane portion 151, 161. The concave surface 151c, 161c adjoins a leading edge 151d, 161d (an edge located where the wind or air stream comes in) and extends alongside the leading edge 151d, 161d in a longitudinal direction of the vane portion 151, 161. The concave surface 151c, 161c is concave in both lateral and longitudinal directions of the vane portion 151, 161. An apex end of the concave surface 151c, 161c is located at the top of the vane portion 151, 161. Further, the apex end of the concave surface 151c, 161c is closer to a trailing edge 151e, 161e than the leading edge 151d, 161d of the vane portion. That is, the apex end of the concave surface 151c, 161c is close to the trailing edge 151e, 161e with respect to a central axis of the spoiler. Thus, a concave space defined by the concave surface 151c, 161c is enlarged, thus providing greater reaction forces to the first and second spoilers 150, 160. Inclination angles of the leading portion 151a, 161a and the trailing portion 151b, 161b, curvature of the concave surface 151c, 161c, etc. can be determined so as to produce suitable reaction forces against the air stream.

Further, the first and second spoilers 150, 160 have a plurality of indents 151f, 151g, 151h, 161f, 161g, 161h for increasing the reaction against the air stream at its leading edge 151d, 161d. The indents 151f, 151g, 151h, 161f, 161g, 161h are arranged along the leading edge 151d, 161d in the concave surface 151c, 161c at equal or predetermined spacing. Some of the indents, e.g., the indents 151g, 151h, 161g, 161h have a profile or a cross-section becoming wider toward the inside of the vane portion. Since the indents 151f, 151g, 151h, 161f, 161g, 161h interact with the wind or air stream impinging thereon, not only the reaction force caused by the concave surface 151c, 161c of the leading portion 151a, 161a, but also the reaction force produced by the indents are applied to each spoiler 150, 160. Thus, each spoiler 150, 160 produces a greater reaction force, thus more efficiently preventing the flat wiper blade 100 from rising up.

In this embodiment, the first and second spoilers 150, 160 have a pair of holders 153, 163 having a hook-shaped cross-section. The holders 153, 163 extend along lateral edges of the spoiler. The holders 153, 163 define the fitting grooves 152, 162 in an underside of the spoiler. That is, the fitting groove 152, 162 is formed in a portion of the holder 153, 163, which face to the inside of the spoiler. A depth of the fitting groove 152, 162 is determined such that each half section of the frame bar 120 can be sufficiently fitted to the fitting groove. Further, a width of the fitting groove 152, 162 (a distance between an upper surface and a lower surface of the fitting groove) may be equal to or somewhat greater than a thickness of the frame bar 120. When the first and second spoilers 150, 160 and the frame bar 120 are assembled together, the first half section 122a and the second half section 122b of the frame bar 120 are fitted to the fitting grooves 152, 162 and the edges 120a, 120b of the frame bar 120 can contact the innermost portion of the fitting grooves 152, 162. Each spoiler 150, 160 has a recess or groove 154, 164, in which the head portion 112 of the wiper strip 110 is situated when the spoilers and the frame bar 120 are assembled, at its underside between the holders 153, 163.

Further, the first and second spoilers 150, 160 have an element for enhancing or reinforcing the durability of the spoiler. Specifically, the first and second spoilers 150, 160 have a reinforcement groove, round groove, chamfer groove or receiving groove 155, 165 in the innermost portion of the fitting groove 152, 162. The receiving grooves 155, 165 extend along the entire length of the fitting grooves 152, 162. The receiving grooves 155, 165 have a circular or oval cross section. That is, a surface of the receiving groove 155, 165 is rounded. Further, a width or diameter of the receiving groove 155, 165 (a maximum vertical distance in the receiving groove) is greater than the width of the fitting groove 152, 162. Accordingly, the edge 120a, 120b of the frame bar 120 is positioned in the receiving groove 155, 165 in the fitting groove 152, 162. The edge of the frame bar 120 can contact the rounded inner surface of the receiving groove 155, 165 in the fitting groove 152, 162 when the flat wiper blade 100 operates.

The edge 120a, 120b of the frame bar 120 generally has right-angled corners up and down. Further, fitting grooves may have a cross section with right-angled corners up and down. When the frame bar 120 and a spoiler with such fitting grooves are assembled together, the edge 120a, 120b of the frame bar 120 with right-angled corners is fitted to the fitting groove with right-angled corners. That is, the right-angled corners of the edge 120a, 120b are brought into contact with the right-angled corners of the fitting groove without any gap or clearance. When the flat wiper blade 100 is oscillated on the windshield surface by the wiper arm, the edges 120a, 120b of the frame bar 120 apply a surface pressure to the fitting grooves due to the forces exerted to the flat wiper blade 100 by the wiper arm. Such a surface pressure can be concentrated on the right-angled corners of the fitting grooves with which the right-angled corners of the edges 120a, 120b are in contact. If the flat wiper blade 100 works for a long time, then the concentration of such a surface pressure may cause cracks or tears in the right-angled corners of the fitting grooves. Such cracks or tears may deteriorate the durability of the spoiler.

As described above, since the receiving groove 155, 165 having a circular cross-section is formed in the innermost portion of the fitting groove 152, 162, the right-angled corners of the edges 120a, 120b of the frame bar 120 are brought into contact the rounded inner surface of the receiving groove 155, 165. Thus, the fitting grooves 152, 162 and the receiving grooves 155, 165 do not have points or portions on which surface pressures or forces concentrate, thus enhancing the durability or stiffness of the spoiler.

Further, as mentioned above, the frame bar 120 may be made by coating a metallic or plastic bar with paint. In such a case, the paint coating may not be formed uniformly on the bar. Thus, the paint cakes or forms drops on or in the vicinity of the edges 120a, 120b of the frame bar and thus the paint coating may form swelled or protruding portions on the edges 120a, 120b. Thus, if the frame bar 120 with a portion of the paint coating swelled or protruding on the edges 120a, 120b is fitted to the fitting grooves 152, 162, then the swelled or protruding portion of the paint coating presses the inner surface of the fitting grooves 152, 162, thereby causing cracks or tears in the pressed spots due to the concentration of the surface pressure or force. However, as described above, the receiving grooves 155, 165, which have the rounded inner surface and the diameter greater than the width of the fitting groove, are formed in the fitting grooves. Thus, the receiving groove 155, 165 can receive the swelled or protruding portions of the paint coating therein. Accordingly, even when the frame bar 120 having a non-uniform thickness and the spoilers 150, 160 are assembled together, the durability of the spoilers 150, 160 can last for a long time.

In some embodiment, said receiving groove may be formed in two lines in the fitting groove 152, 162. That is, the fitting groove 152, 162 may have two chamfer grooves or receiving grooves spaced apart in the inner surface of the fitting groove. In such a case, the inner surface of the fitting groove comprises said two receiving grooves and a flat surface therebetween.

Further, the first and second spoilers 150, 160 have an element enabling application to frame bars 120 having different thicknesses. By way of example, the frame bar 120 may have a thickness of 0.5 mm to 1.5 mm. For application to such frame bars having different thicknesses, the first and second spoilers 150, 160 have an element that applies pressure to the first and second half sections 122a, 122b of the frame bar 120 to bring each half section into close contact with the fitting grooves. Said element includes a pressing ridge 156, 166 that protrudes inwardly from one of opposed upper and lower surfaces of the fitting groove 152, 162. In this embodiment, the pressing ridge 156, 166 protrudes upwardly from the lower surface of the fitting groove 152, 162. The pressing ridges 156, 166 longitudinally extend along the lower surface of each fitting groove 152, 162. In some embodiment, the pressing ridge 156, 166 may protrude from the upper surface of the fitting groove 152, 162. Further, in some embodiment, a plurality of the pressing ridges 156, 166 may be formed in a line along the lower surface of the fitting groove 152, 162. The width of the fitting groove 152, 162 is decreased by a protrusion height of the pressing ridge 156, 166. Accordingly, when the first and second spoilers 150, 160 are applied to the frame bar having a small thickness, the frame bar having a small thickness can be stably and firmly fitted to the fitting grooves 152, 162 with the pressure vertically applied to the frame bar by the pressing ridges 156, 166.

The first and second spoilers 150, 160 have said second element for engagement to the bracket 130. As described above, said second element includes a protrusion and a groove. In this embodiment, the first spoiler 150 has a latching claw 157 at its base end. Further, the second spoiler 160 has a pair of latching grooves 167 at its base end.

Figure 20:
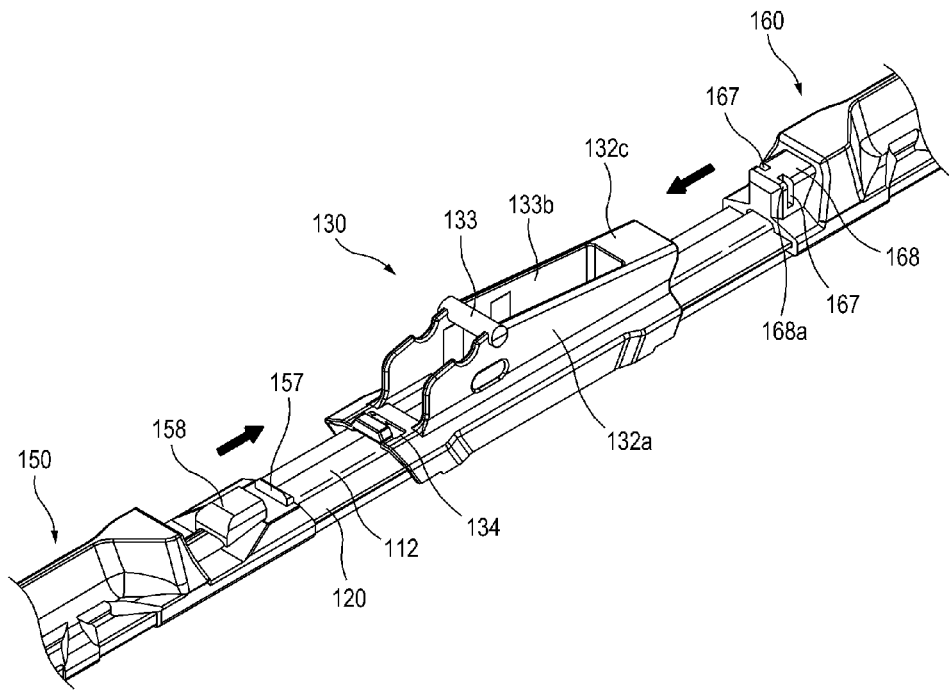
FIG. 20 is a perspective view showing a coupling between the bracket and the first and second spoilers.
Figure 21:
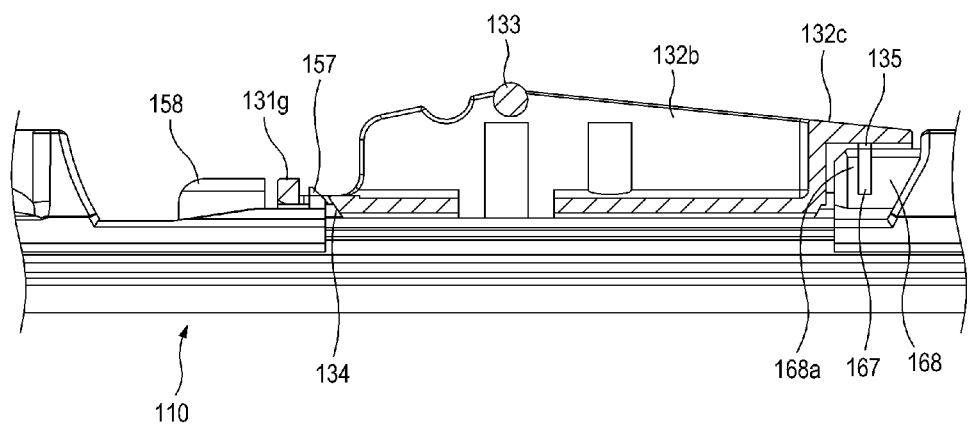
FIG. 21 is a sectional view showing a coupled configuration between the bracket and the first and second spoilers.
Figure 22:
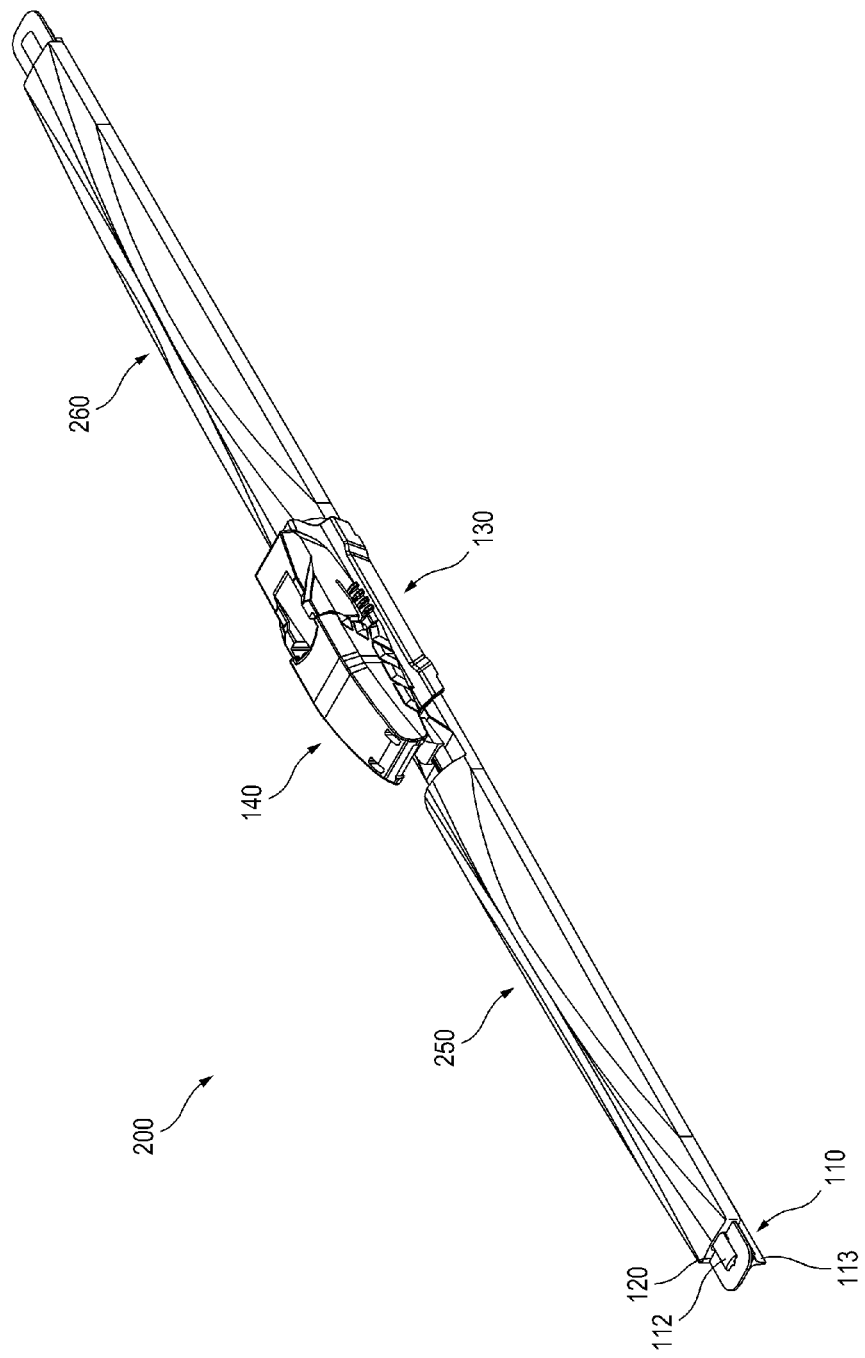
FIG. 22 is a perspective view showing a flat wiper blade according to a second embodiment.
Figure 23:
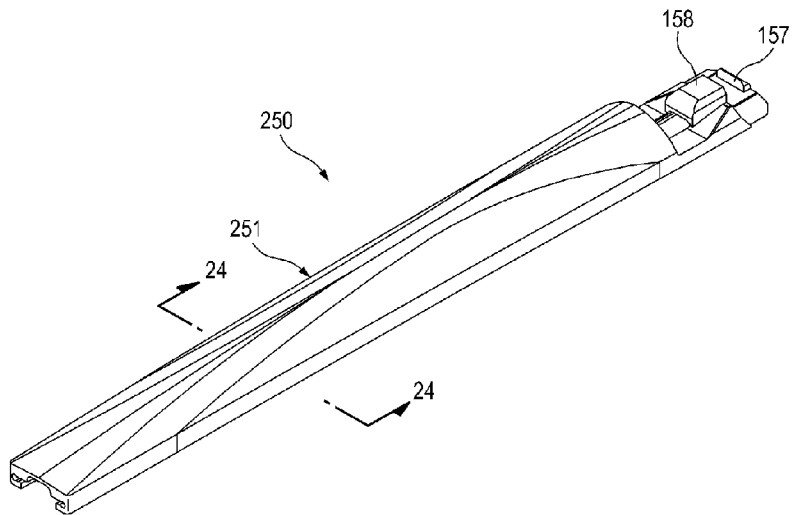
FIG. 23 is a perspective view of a first spoiler shown in FIG. 22.
Figure 24:
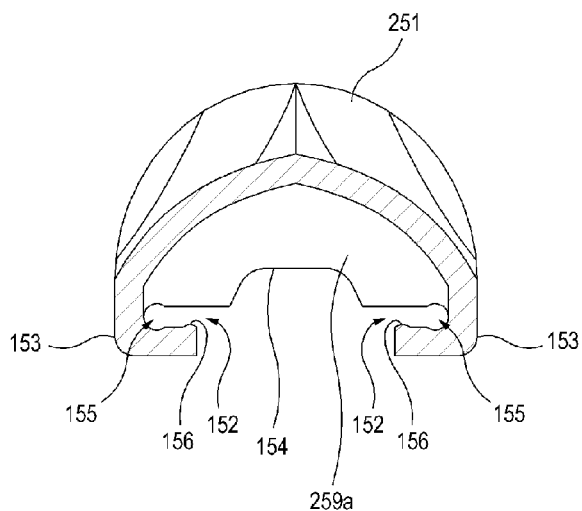
FIG. 24 is a sectional view taken along the line 24-24 in FIG. 23.
Figure 25:
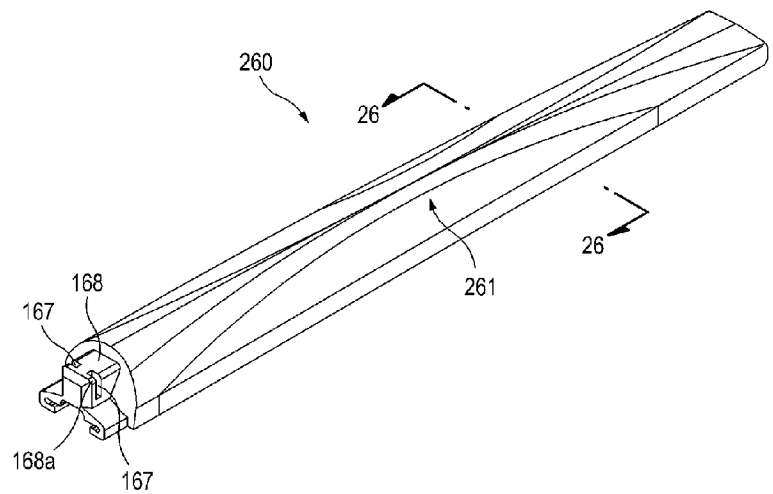
FIG. 25 is a perspective view of a second spoiler shown in FIG. 22.
Figure 26:
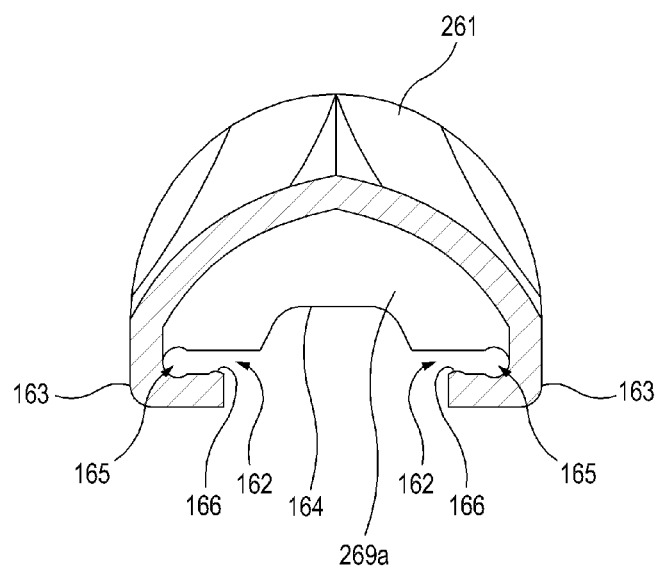
FIG. 26 is a sectional view taken along the line 26-26 in FIG. 25.
Figure 27:
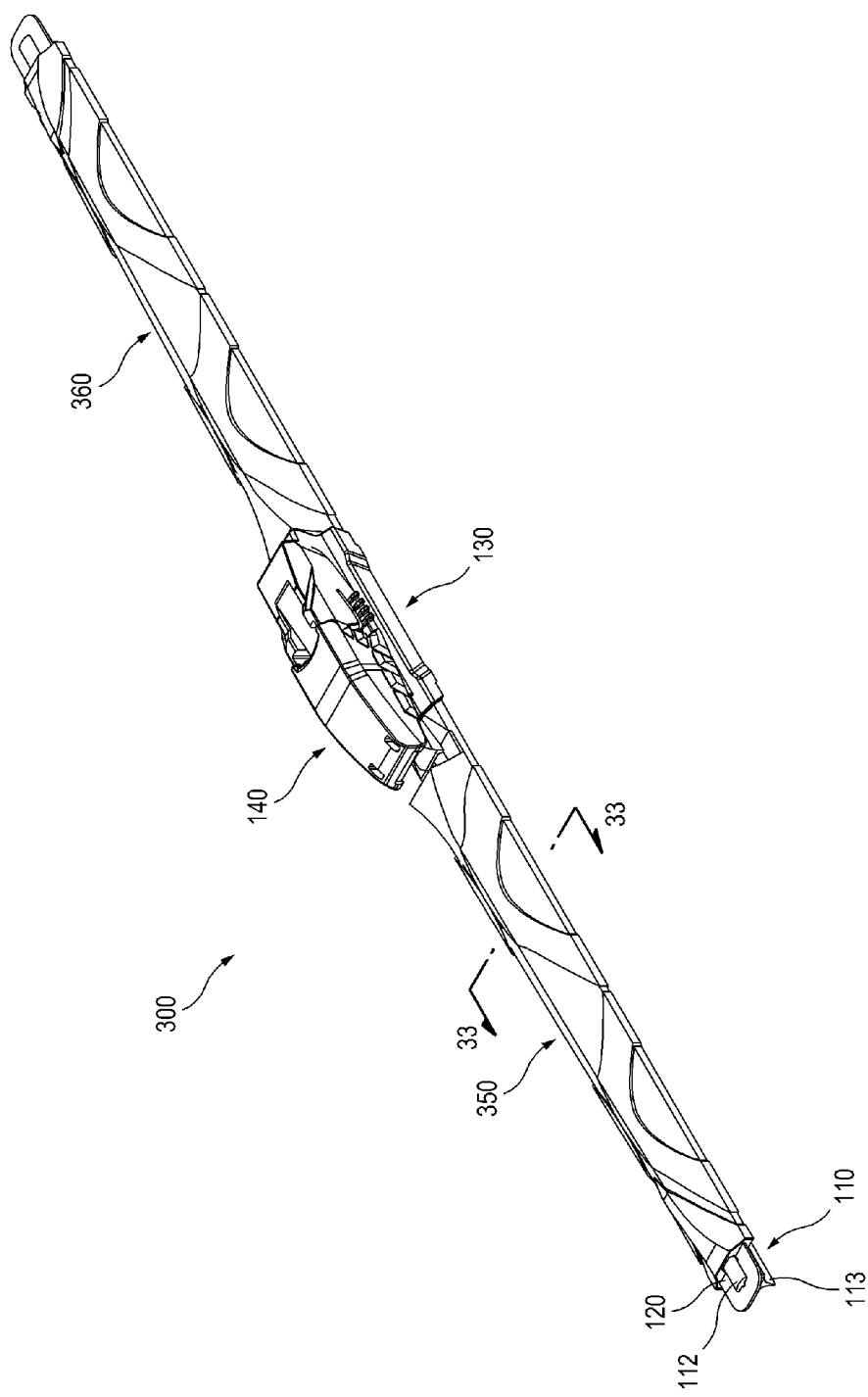
FIG. 27 a perspective view showing a flat wiper blade according to a third embodiment.
Figure 28:
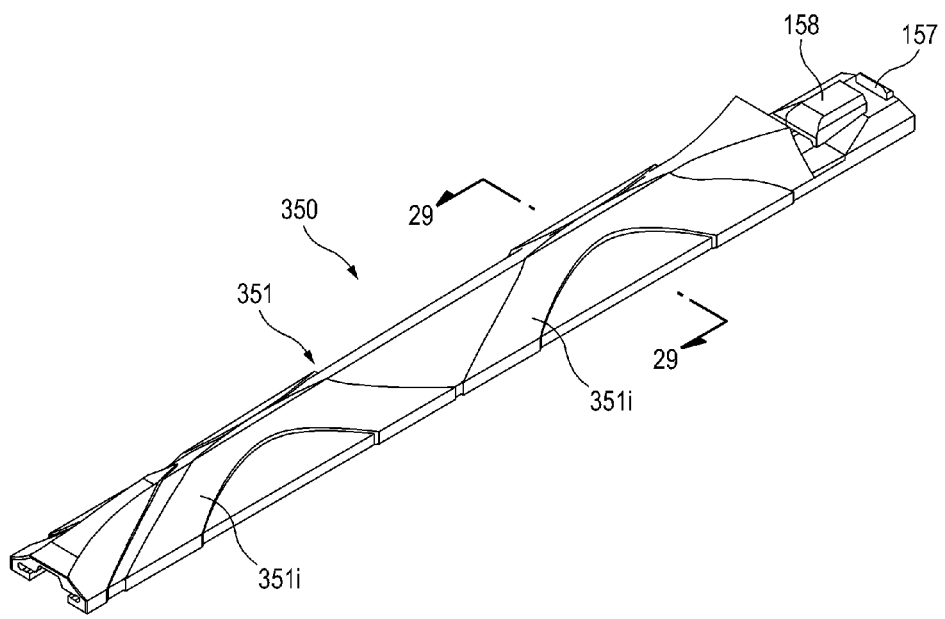
FIG. 28 is a perspective view of a first spoiler shown in FIG. 27.
Figure 29:
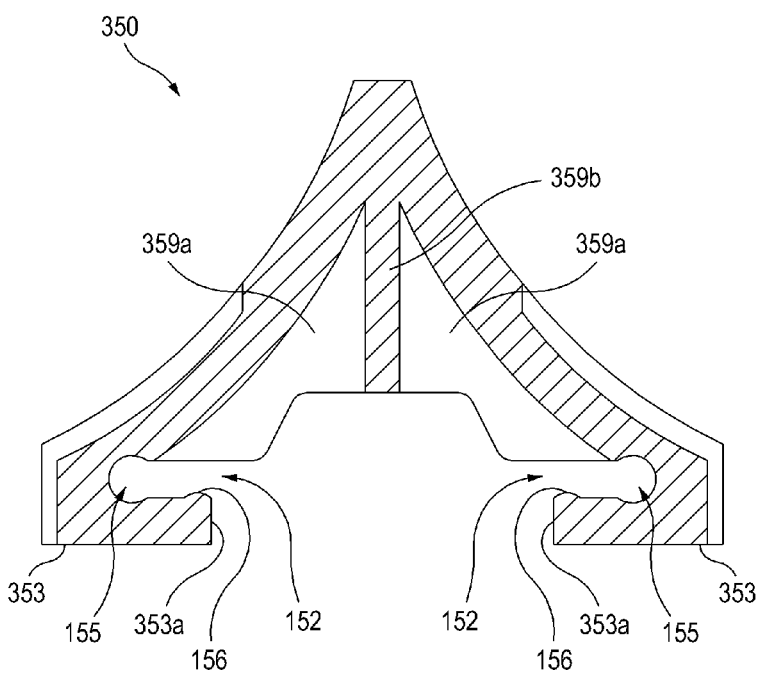
FIG. 29 is a sectional view taken along the line 29-29 in FIG. 28.
Figure 30:
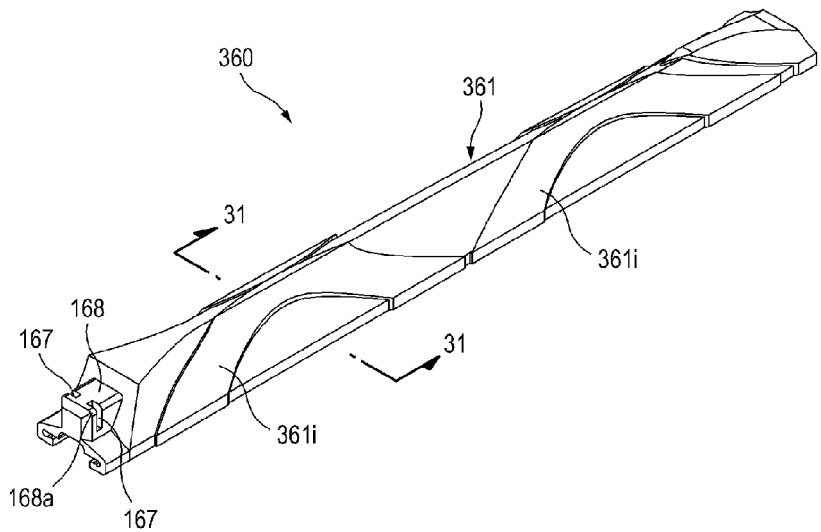
FIG. 30 is a perspective view of a second spoiler shown in FIG. 27.
Figure 31:
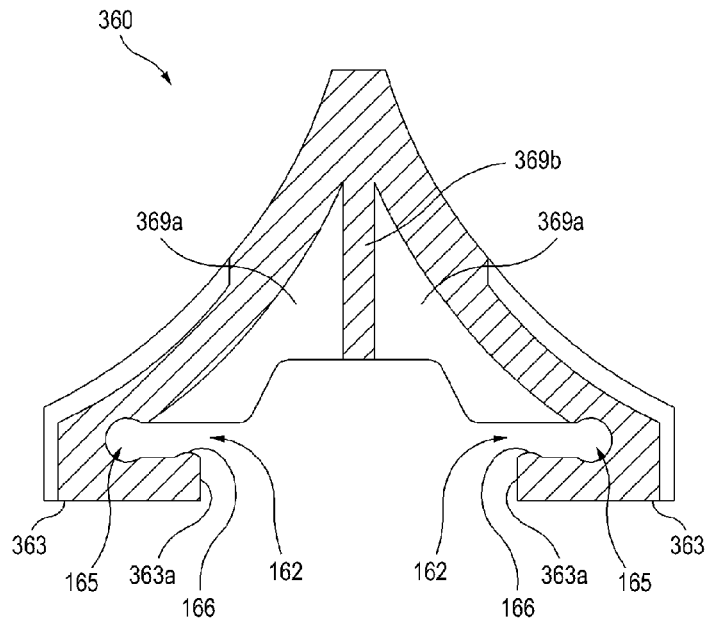
FIG. 31 is a sectional view taken along the line 31-31 in FIG. 30.
Figure 32:
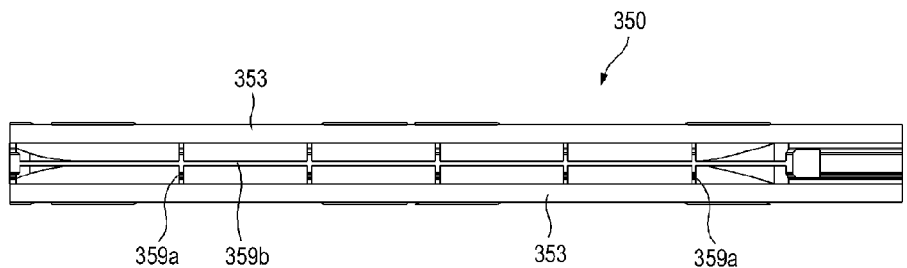
FIG. 32 is a bottom view of the first spoiler shown in FIG. 27.

The base end portion of the first spoiler 150 does not have the vane portion 151 and is flat. The latching claw 157 protrudes upwardly on the base end of the first spoiler 150. A lateral distance of the latching claw 157 is slightly shorter than that of the slot 134 of the bracket 130. A portion of the latching claw 157 facing to the bracket 130 is chamfered. Specifically, the latching claw 157 has a beveled surface 157a at its surface facing to the bracket 130 and a vertical surface 157b at the opposite surface thereto. As shown in FIG. 20, the frame bar 120 is fitted to the first spoiler 150 and then the base end of the first spoiler 150 approaches the front end of the bracket 130. As the first spoiler 150 is further moved to the bracket 130, the latching claw 157 is flexed or curved toward the distal end of the first spoiler 150. If the first spoiler 150 is furthermore moved, the latching claw 157 returns and is then inserted to the slot 134 to engage the slot 134. Since the surface of the latching claw 157 facing to the bracket 130 is chamfered, the latching claw 157 can be smoothly curved and the first spoiler 150 can be easily joined to the bracket 130. As shown in FIG. 21, when the first spoiler 150 is joined to the bracket 130, the vertical surface 157b of the latching claw 157 is caught to the catch protrusion 131g of the bracket 130, thus preventing the first spoiler 150 being separated from the bracket 130.

The first spoiler 150 has a projection 158 at its base end portion between the latching claw 157 and the vane portion 151. The projection 158 is positioned so as to be in a front portion of the adaptor 140 when the adaptor 140 is pivoted toward the first spoiler 150.

The base end portion of the second spoiler 160 does not have the vane portion 161. The second spoiler 160 has an insertion portion 168 extending from a base end of the vane portion 161 toward the base end of the second spoiler 160. The insertion portion 168 has a rectangular cross section. A width and a height of the insertion portion are set such that the insertion cavity 132e formed in the rear of the support wall portions 132a, 132b of the bracket 130 can receive the insertion portion 168. The base end of the vane portion 161 adjacent to the insertion portion 168 has a surface inclined so as to correspond to the rear straight edge of the bracket 130. A pair of the latching grooves 167 are formed in the vicinity of a base end of the insertion portion 168. The latching grooves 167 are oriented in the lateral direction of the frame bar 120. Elastic portion 168a is formed between the base end of the insertion portion 168 and the latching grooves 167 due to the latching grooves 167. A surface of the elastic portion 168a facing toward the bracket 130 is chamfered. As shown in FIG. 20, the frame bar 120 is fitted to the second spoiler 160 and thus the base end of the second spoiler 160 is moved to the rear end of the bracket 130. Then, the insertion portion 158 is inserted into the insertion cavity 132e and the elastic portion 168a abuts against the engaging ribs 135. As the second spoiler 160 is further moved to the bracket 130, the elastic portion 168a passes through the engaging ribs 135 while being flexed or curved toward the distal end of the second spoiler 160. If the elastic portion 168a passes beyond the engaging ribs 135, then the elastic portion 168a returns and the engaging ribs 135 are fitted to the latching grooves 167. Since the surface of the elastic portion 168a facing to the bracket 130 is chamfered, the elastic portion 168a can be smoothly curved and the second spoiler 160 can be easily joined to the bracket 130. As shown in FIG. 21, when the second spoiler 160 is joined to the bracket 130, the engaging ribs 135 are fitted to the latching grooves 167, thus preventing the second spoiler 160 being separated from the bracket 130.

FIGS. 22 to 26 show a flat wiper blade 200 according to a second embodiment. The flat wiper blade 200 according to this embodiment has the same configuration as the flat wiper blade 100 according to the first embodiment except the configuration of a portion of the spoiler. In FIGS. 22 to 26, the same elements or parts as those of the flat wiper blade 100 of the first embodiment are denoted by the same reference numerals.

Referring to FIGS. 22 to 26, first and second spoilers 250, 260 have a vane portion 251, 261 that are symmetrically shaped. The vane portion 251, 261 longitudinally extends from the proximity of a base end of each spoiler 250, 260 to a distal end of each spoiler. The vane portion 251, 261 has a profile that reacts to wind or air stream created during running of a vehicle and produces a reaction force preventing the flat wiper blade 200 from rising up. In this embodiment, the vane portion 251, 261 has a streamline cross sectional profile such as a circular arc shape. Further, such a cross sectional profile of the vane portion 251, 261 becomes gradually smaller from the base end of each spoiler toward the distal end. The first and second spoilers 250, 260 have a plurality of ribs 259a, 269a for reinforcing stiffness of the spoiler in the vane portion 251, 261. The ribs 259a, 269a are oriented in the lateral direction and are arranged at equal spacing. A recess 154, 164 receiving the head portion 112 of the wiper strip 110 is formed at a lower end of the rib 259a, 269a. The fitting grooves 152, 162, to which the frame bar 120 is inserted and fitted, longitudinally extend from the base end of each spoiler to the distal end underneath the vane portion 251, 261. The receiving groove 155, 165, which the edge 120a, 120b of the frame bar 120 contacts, longitudinally extends in the innermost portion of each fitting groove. Further, the pressing ridge 156, 166 for bring the frame bar 120 into close contact with the fitting groove protrudes upward from the lower surface of the fitting groove 152, 162. The first spoiler 250 has the latching claw 157, which engages the slot 134 of the bracket 130, at its base end. Further, the second spoiler 260 has the latching grooves 167, which engage the engaging ribs 135 of the bracket 130, at its base end.

FIGS. 27 to 33 show a flat wiper blade 300 according to a third embodiment. The flat wiper blade 300 according to this embodiment has the same configuration as the flat wiper blade 100 except the configuration of a portion of the spoiler. In FIGS. 27 to 33, the same elements or parts as those of the flat wiper blade 100 of the first embodiment are denoted by the same reference numerals.

Referring to FIGS. 27 to 33, first and second spoilers 350, 360 have a vane portion 351, 361 that are symmetrically shaped. The vane portion 351, 361 longitudinally extends from the proximity of a base end of each spoiler 350, 360 to a distal end of each spoiler. The vane portion 351, 361 has a cross sectional profile with a pair of symmetrical concave surfaces. The cross sectional profile of the vane portion 351, 361 becomes gradually smaller from the base end of each spoiler toward the distal end. Further, the vane portion 351, 361 has a V-shaped embossed surface 351i, 361i. The first and second spoilers 350, 360 have a plurality of transverse ribs 359a, 369a that are oriented in a lateral direction and a longitudinal rib 359b, 369b that is oriented in a longitudinal direction. The transverse ribs 359a, 369a are arranged at equal spacing. The longitudinal rib 359b, 369b extends from a base end of the vane portion 351, 361 to a distal end thereof. A recess for preventing interference with the head portion 112 of the wiper strip is formed in lower ends of the transverse ribs 359a, 369a and the longitudinal rib 359b, 369b.

The first and second spoilers 350, 360 have a pair of holders 353, 363 having a hook-shaped cross section. The holders 353, 363 extend along either lateral edge of the spoiler. The fitting groove 152, 162, to which the frame bar 120 is inserted and fitted, is formed in a portion of the holder 353, 363, which face to the inside of the spoiler. The receiving groove 155, 165, in which the edge of the frame bar 120 is received, longitudinally extends in the innermost portion of each fitting groove. Further, the pressing ridge 156, 166 for bring the frame bar 120 into close contact with the fitting groove protrudes upward from the lower surface of the fitting groove 152, 162. The first spoiler 350 has the latching claw 157, which engages the slot 134 of the bracket 130, at its base end.

Further, the second spoiler 360 has the latching grooves 167, which the engaging ribs 135 of the bracket 130 engage, at its base end.

Figure 33:
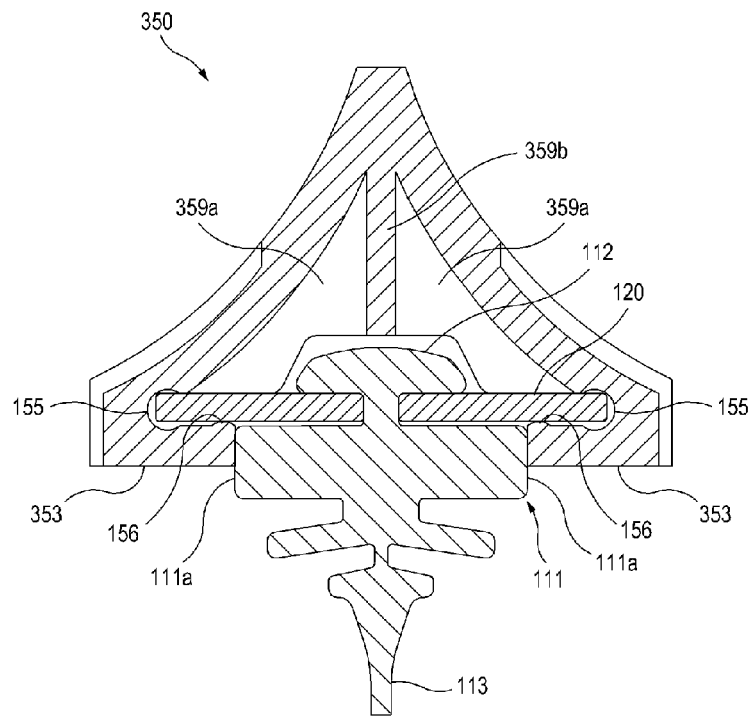
FIG. 33 is a sectional view taken along the line 33-33 in FIG. 27.
Figure 34:
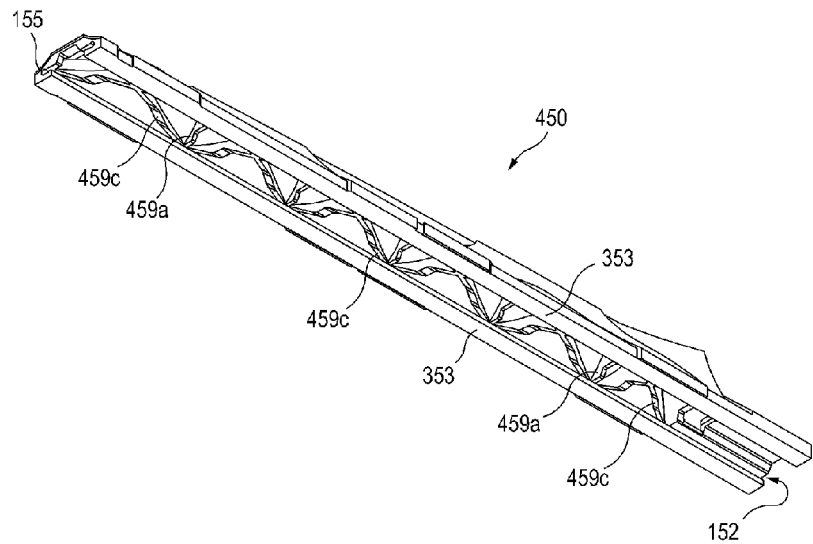
FIG. 34 is a lower perspective view of a first spoiler employed in a flat wiper blade according to a fourth embodiment.
Figure 35:
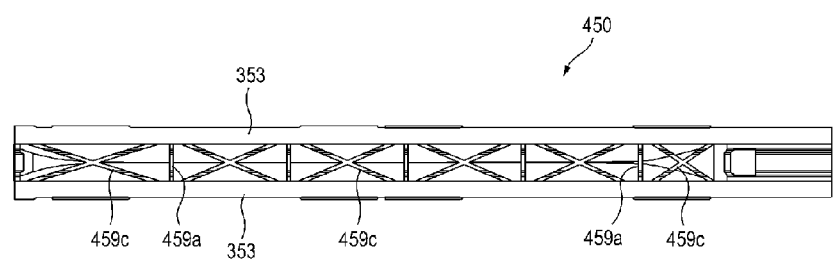
FIG. 35 is a bottom view of the first spoiler shown in FIG. 34.
Figure 36:
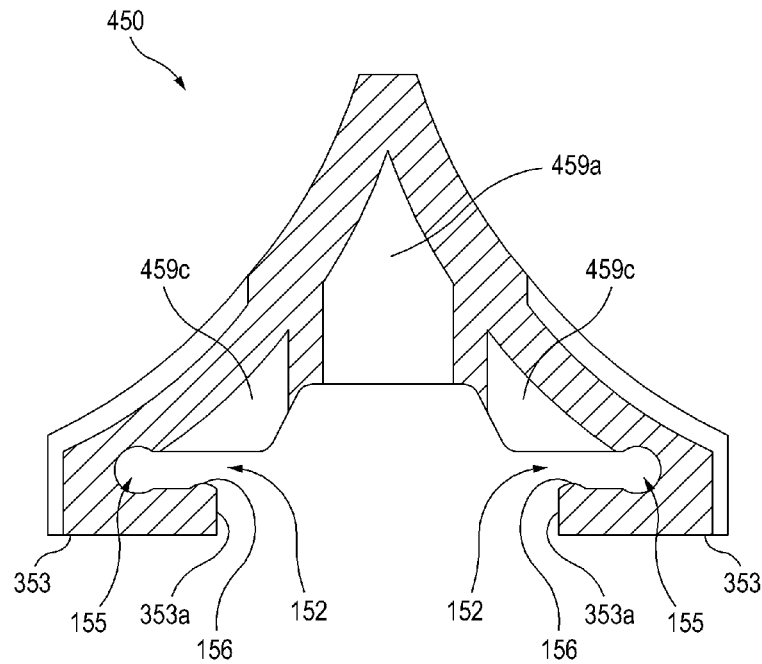
FIG. 36 is a cross-sectional view of the first spoiler employed in the flat wiper blade according to the fourth embodiment.
Figure 37:
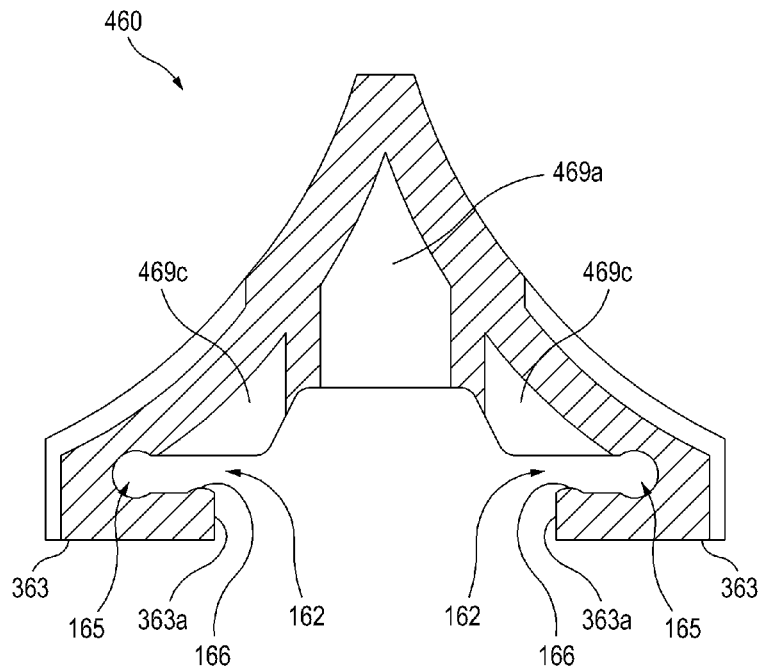
FIG. 37 is a cross-sectional view of a second spoiler employed in the flat wiper blade according to the fourth embodiment.
Figure 38:
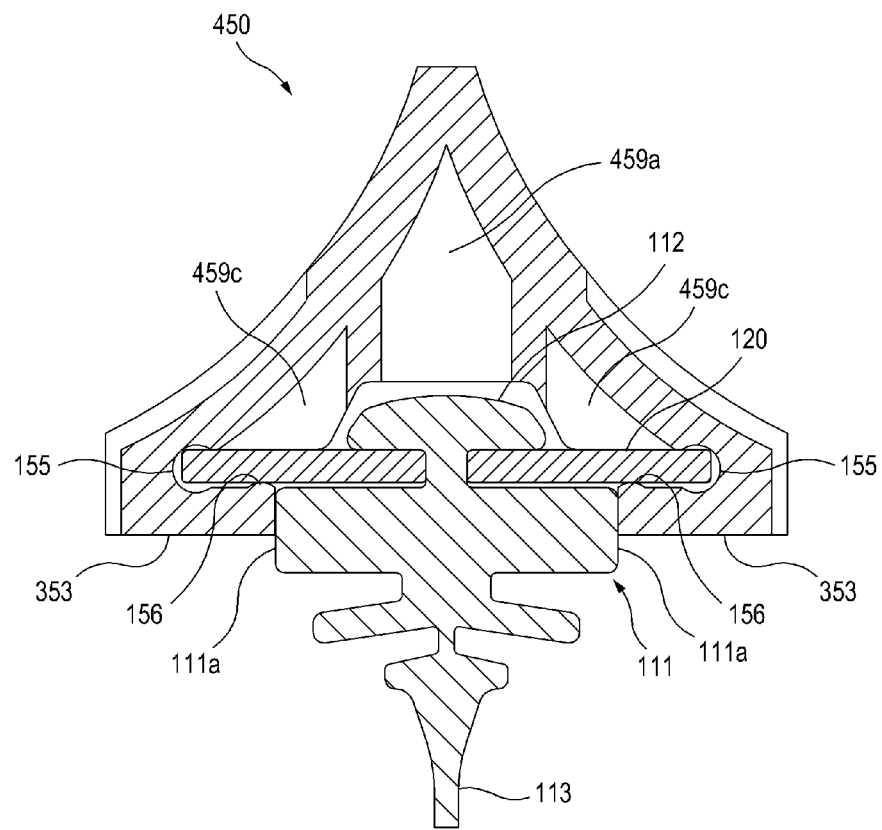
FIG. 38 is a cross-sectional view of the flat wiper blade according to the fourth embodiment.

In this embodiment, the first and second spoilers 350, 360 are configured to closely contact the wiper strip 110 in the lateral direction of the wiper strip. The first and second spoilers 350, 360 sandwich or pinch the body portion 111 of the wiper strip 110 along the longitudinal direction of the body portion 111 throughout lower lateral edges of the spoiler. Referring to FIG. 33, the pair of the holders 353, 363 of the spoiler are in close contact with lateral surfaces 111a of the body portion 111 at leading end surfaces 353a, 363a. The leading end surfaces 353a, 363a of the holders 353, 363 are in close contact with the lateral surfaces 111a of the body portion 111 by interference fit or transition fit. Thus, the first and second spoilers 350, 360 have a sealing structure at a position where the wiper strip is located. For example, when a wiper blade operates in a rainy or snowy weather, rainwater or snow can enter or infiltrates to the inside of the spoiler through the wiper strip 110 and the frame bar 120. The infiltrating rainwater or snow may rust the frame bar 120. In particular, if the water having infiltrated to the spoiler freezes in wintertime, then the softness or flexibility of the wiper strip 110 made from a rubber material becomes worse and the hardness or brittleness rather becomes higher to thereby harden the wiper strip. This can cause the deterioration of the wiping performance of the wiper strip 110. However, as described above, the interference fit or transition fit between the holders 353, 363 and the wiper strip 110 forms the sealing structure for the inside of the spoiler, thus preventing rainwater or snow from infiltrating to the inside of the spoiler. Further, since the spoiler sandwiches or pinches the wiper strip 110 along the longitudinal direction thereof, the wiper strip 110 can be firmly held on the flat wiper blade 100.

FIGS. 34 to 38 show a flat wiper blade according to a fourth embodiment. The flat wiper blade according to this embodiment has the same configuration as the flat wiper blades 100, 300 according to the first and third embodiments except the configuration of the ribs in the spoiler. In FIGS. 34 to 38, the same elements or parts as those of the flat wiper blades 100, 300 of the first and third embodiments are denoted by the same reference numerals.

Referring to FIGS. 34 to 38, first and second spoilers 450, 460 have a vane portion 351, 361 that are symmetrically shaped. The first and second spoilers 450, 460 have a plurality of transverse ribs 459a, 469a and a plurality of cross ribs 459c, 469c therein. The transverse ribs 459a, 469a are oriented in a lateral direction of the spoiler and are arranged at equal spacing. The cross ribs 459c, 469c are formed in an X shape and are located between neighboring transverse ribs 459a, 469a and in the vicinity of the base and distal ends of the spoiler. The cross ribs 459c, 469c increase the stiffness of the spoiler in both lateral and longitudinal directions of the spoiler. A recess for preventing interference with the head portion 112 of the wiper strip is formed in lower ends of the transverse ribs 459a, 469a and the cross ribs 459c, 469c.

The first and second spoilers 450, 460 have a pair of the holders 353, 363 extending along either lateral edge of the spoiler. The fitting groove 152, 162, to which the frame bar 120 is inserted and fitted, is formed in a portion of the holder 353, 363, which face to the inside of the spoiler. The receiving groove 155, 165, in which the edge of the frame bar 120 is received, longitudinally extends in the innermost portion of the fitting groove. Further, the pressing ridge 156, 166 for bring the frame bar 120 into close contact with the fitting groove protrudes upward from the lower surface of the fitting groove 152, 162. The first spoiler 450 has the latching claw 157, which engages the slot 134 of the bracket 130, at its base end. Further, the second spoiler 460 has the latching grooves 167, which the engaging ribs 135 of the bracket 130 engage, at its base end. Further, the leading end surfaces of the holders 353, 363 are in close contact with the body portion 111 of the wiper strip by interference fit or transition fit.

In the embodiment shown in the drawings, each spoiler 150, 160, 250, 260, 350, 360, 450, 460 has a length shorter than a distance between the bracket 130 and one end of the frame bar 120. In other embodiment, the spoiler may have a length equal to the distance between the bracket 130 and one end of the frame bar 120. In other embodiment, the spoiler may have a length longer than the distance between the bracket 130 and one end of the frame bar 120. In such an embodiment, the distal end of the spoiler may be configured not to have the fitting grooves.

Moreover, in the embodiment shown in the drawings, the slot is located in the front end of the bracket (one end of the bracket), while the engaging ribs are located in the rear end of the bracket (the opposite end of the bracket). In other embodiment, the slot may be located in the rear end of the bracket and the engaging ribs may be located in the front end of the bracket. Further, only the slot may be provided in the front and rear ends of the bracket. Otherwise, only the engaging ribs may be provided in the front and rear ends of the bracket. In such a case, the spoilers may have one of the latching claw and the latching groove.

While the present invention has been shown and described by way of the foregoing embodiments, the present invention should not be limited thereto. It will be apparent to those of ordinary skill in the art that various alternations or modifications may be made without departing from the scope of the present invention.

The invention claimed is:

1. A flat wiper blade, comprising:
a wiper strip (110);
a single elongated frame (120) configured to hold and support the wiper strip;
first and second spoilers (150, 160) joined to the frame as opposed to each other, each including a pair of fitting grooves (152, 162) extending in a longitudinal direction of the frame, the frame being fitted to the fitting grooves, and a receiving groove (155, 165) extending in the longitudinal direction in each of the fitting grooves and receiving an edge of the frame, the receiving groove having a width greater than a width of the fitting groove; and
a connecting unit for connection to a wiper arm, the connecting unit being joined to the frame between the first spoiler and the second spoiler, the connecting unit engaging the first spoiler and the second spoiler,
wherein the connecting unit includes a bracket (130) joined to the frame and having a pivot shaft (133),
wherein the bracket engages a base end of the first spoiler at one end and engages a base end of the second spoiler at an opposite end,
wherein the first spoiler has a latching claw (157) at the base end thereof and the second spoiler has a latching groove (167) at the base end thereof, and
wherein the bracket has a slot (134) at the one end thereof and an engaging rib (135) at the opposite end thereof, the latching claw engaging the slot and the engaging rib engaging the latching groove.

2. The flat wiper blade of claim 1, wherein the receiving groove has a rounded surface.

3. The flat wiper blade of claim 1, wherein the first and second spoilers have a holder (153, 163) extending along either edge thereof and located under the frame, and wherein the fitting groove is formed along an inside of the holder.

4. The flat wiper blade of claim 3, wherein the holder extends to closely contact the wiper strip.

5. The flat wiper blade of claim 4, wherein the holder and the wiper strip are in close contact with each other by interference fit.

6. The flat wiper blade of claim 1, wherein the first and second spoilers have a pressing ridge (156) protruding inwardly of the fitting groove in the fitting groove.

7. The flat wiper blade of claim 1, wherein the first and second spoilers have a concave surface (151c) extending along a leading edge (151d, 161d), the concave surface concave in both lateral and longitudinal directions of the first and second spoilers, and wherein an apex end of the concave surface is closer to a trailing edge of the first and second spoilers than the leading edge.

8. The flat wiper blade of claim 1, wherein the bracket has an insertion cavity (132e) at the opposite end, wherein the second spoiler has an insertion portion (168) at the base end thereof, the insertion portion being fitted to the insertion cavity, and wherein the engaging rib is formed in the insertion cavity in a lateral direction of the frame and the latching groove is formed in the insertion portion in the lateral direction of the frame.

9. The flat wiper blade of claim 1, wherein the connecting unit further includes an adaptor (140) pivotally mounted on the bracket via the pivot shaft and being configured to be separably connected to the wiper arm.

10. The flat wiper blade of claim 1, wherein the first and second spoilers have a plurality of cross ribs (459c, 469c) therein.

11. A flat wiper blade, comprising:

a wiper strip (110);

a single elongated frame (120) configured to hold and support the wiper strip;

first and second spoilers (150, 160) joined to the frame as opposed to each other, each including a pair of fitting grooves (152, 162) extending in a longitudinal direction of the frame, the frame being fitted to the fitting grooves, and a receiving groove (155, 165) extending in the longitudinal direction in each of the fitting grooves and receiving an edge of the frame, the receiving groove having a width greater than a width of the fitting groove; and a connecting unit for connection to a wiper arm, the connecting unit being joined to the frame between the first spoiler and the second spoiler, the connecting unit engaging the first spoiler and the second spoiler, wherein the first and second spoilers have a concave surface (151c) extending along a leading edge (151d, 161d), the concave surface concave in both lateral and longitudinal directions of the first and second spoilers, wherein an apex end of the concave surface is closer to a trailing edge of the first and second spoilers than the leading edge, and wherein the first and second spoilers have a plurality of indents (151f, 151g, 151h, 161f, 161g, 161h) arranged along the leading edge.

* * * * *